US011099462B1

(12) United States Patent
Lee

(10) Patent No.: US 11,099,462 B1
(45) Date of Patent: Aug. 24, 2021

(54) COMBINATION OF HOLDER AND SELFIE STICK

(71) Applicant: IMAGINE SEA, Goyang-si (KR)

(72) Inventor: Sang Soon Lee, Gyeonggi-do (KR)

(73) Assignee: IMAGINE SEA, Goyang-si (KR)

( * ) Notice: Subject to any disclaimer, the term of this patent is extended or adjusted under 35 U.S.C. 154(b) by 66 days.

(21) Appl. No.: 16/631,695

(22) PCT Filed: Apr. 26, 2019

(86) PCT No.: PCT/KR2019/005048
§ 371 (c)(1),
(2) Date: Jan. 16, 2020

(87) PCT Pub. No.: WO2020/111406
PCT Pub. Date: Jun. 4, 2020

(30) Foreign Application Priority Data

Nov. 30, 2018 (KR) .................. 10-2018-0152266

(51) Int. Cl.
| *F16M 13/04* | (2006.01) |
| *G03B 17/56* | (2021.01) |
| *H04N 5/232* | (2006.01) |
| *F16M 13/06* | (2006.01) |
| *H04M 1/04* | (2006.01) |

(52) U.S. Cl.
CPC ........... *G03B 17/561* (2013.01); *F16M 13/04* (2013.01); *F16M 13/06* (2013.01); *H04N 5/23206* (2013.01); *H04M 1/04* (2013.01)

(58) Field of Classification Search
USPC ......................................... 396/420
See application file for complete search history.

(56) References Cited

U.S. PATENT DOCUMENTS

| 10,718,466 B2* | 7/2020 | Chen ................ F16M 13/04 |
| 2016/0125988 A1* | 5/2016 | Lee .................. H01F 7/021 |
| | | 361/807 |
| 2019/0163235 A1* | 5/2019 | Sherman ............. H04M 1/04 |

(Continued)

FOREIGN PATENT DOCUMENTS

| CN | 207080781 U | 3/2018 |
| JP | 7-51153 A | 2/1995 |
| JP | 2004-117711 A | 4/2004 |

(Continued)

*Primary Examiner* — Clayton E. LaBalle
*Assistant Examiner* — Warren K Fenwick
(74) *Attorney, Agent, or Firm* — Sughrue Mion, PLLC

(57) ABSTRACT

A combination of a holder and a selfie stick of the present invention includes a case main body; an attachable disk attached to a back surface of the case main body; a case main body supporter formed of an attachable disk coupling part rotatably coupled to the attachable disk, and an extending part configured to extend from the attachable disk coupling part; a folding part hinge-coupled to the case main body supporter to be folded to be spaced apart from the case main body supporter; a folding part supporter elongated in a longitudinal direction of the folding part to support the folding part and serve as a holder and a handle; and a first extendable stick and a second extendable stick configured to space the folding part supporter apart from the folding part to serve as selfie sticks with the folding part and the folding part supporter.

8 Claims, 17 Drawing Sheets

(56) References Cited

U.S. PATENT DOCUMENTS

2021/0165306 A1\* 6/2021 Guo ...................... F16M 13/04

FOREIGN PATENT DOCUMENTS

| KR | 10-2016-0137325 A | 11/2016 |
| --- | --- | --- |
| KR | 10-2017-0131188 A | 11/2017 |
| KR | 10-1792412 B1 | 11/2017 |
| KR | 10-2018-0039789 A | 4/2018 |

\* cited by examiner

COMBINATION OF HOLDER AND SELFIE STICK

CROSS REFERENCE TO RELATED APPLICATIONS

This application is a National Stage of International Application No. PCT/KR2019/005048 filed Apr. 26, 2019, claiming priority based on Korean Patent Application No. 10-2018-0152266, filed Nov. 30, 2018.

TECHNICAL FIELD

The present invention relates to a combination of a holder and a selfie stick capable of serving as a selfie stick to allow a user by him or herself to space a smart phone away to film him or herself using the smart phone by the deformation and as a holder which allows the smart phone to be held thereon.

BACKGROUND ART

Generally, a selfie stick is a device designed to solve many difficulties which are experienced in appropriately taking pictures of one's own appearance and a background using a smart phone without the help of other people.

A general configuration of the selfie stick is provided with a holding part on which a smart phone is held and an extension which is connected to a lower end of the holding part and which is used with a short length when carried and used with an elongated length when used, and the extension is formed in a flexible stick shape.

The selfie stick is an additional device provided separately from the smart phone, and the extension is formed in the flexible stick shape and thus the selfie stick is not easy to carry with the smart phone.

Meanwhile, a smart phone case serves to prevent damage to the smart phone by having a detachable portion which allows the smart phone to be detachable. Since the smart phone case generally has a width and a thickness almost the same as those of the smart phone, the smart phone is carried in a state in which the smart phone is accommodated in the smart phone case.

However, since the selfie stick is not easy to carry with the smart phone, development of a selfie stick easily carried with a smart phone is demanded.

Meanwhile, the smart phone holder serves to hold the smart phone thereon so that the smart phone can be used without being held by a hand.

A smart phone holder is an additional device provided separately from the smart phone like the selfie stick and is generally formed in a fixed type and thus is not easily carried with the smart phone.

There is a smart phone holder that can be carried with the smart phone, but the smart phone holder only has a function which allows a holding angle of the smart phone to be adjusted. A smart phone holder having a function of adjusting the height of the smart phone is difficult to carry and thus a user avoids use thereof, and the smart phone holder has no function of serving as the selfie stick.

To this end, Korean Application Patent No. 10-1792412 has been filed by an applicant (Title of the Invention: A Combination of a Smart Phone Case for Selfie and a Holder).

The combination of a smart phone case for taking a selfie and a holder has a problem in that a process of holding a smart phone is complicated.

Further, the case should be separated from the smart phone when not being used for selfie, that is, when only the smart phone is carried, and in this case, since a case main body should be completely removed from the smart phone, a separate case should be provided to protect the smart phone.

DISCLOSURE

Technical Problem

The present invention is directed to providing a combination of a holder and a selfie stick capable of simply holding a smart phone thereon when the smart phone is held, and conveniently separating the smart phone so that the smart phone is easily carried when not used for taking a selfie and holding.

The present invention is directed to providing a combination of a holder and a selfie stick capable of performing a charging function of a smart phone in addition to having a function of a holder of the smart phone and selfie.

Technical Solution

One aspect of the present invention provides a combination of a holder and a selfie stick including: an attachable disk (10) attached to a back surface of a case main body 2 provided with a space in which a smart phone (1) is accommodated to be laid, and formed as a disk; a case main body supporter (20) formed of an attachable disk coupling part (21) detachably coupled to an outer circumferential surface of the attachable disk (10) to be rotatable, and an extending part (22) configured to extend from the attachable disk coupling part (21) in an outward direction of the case main body (2); a folding part (30) formed in a plate shape which supports the case main body supporter (20) and having one side end portion hinge-coupled to an end portion of the extending part (22) of the case main body supporter (20) to be folded to be in contact with the case main body supporter (20) or spaced apart from the case main body supporter (20); a folding part supporter (40) located at the other side end portion of the folding part (30), having a plate shape elongated in a longitudinal direction of the folding part (30) to support the folding part (30), configured to serve as a holder when a back surface thereof is supported on a floor, and configured to serve as a handle when selfie is taken by a smart phone (1); and a first extendable stick (51) and a second extendable stick (52) configured to connect both sides of the other side end portion of the folding part (30) and one end side portion of the folding part supporter (40) and configured to bring the other side end portion of the folding part (30) into contact with the one side end portion of the folding part supporter (40) to assist in supporting the folding part supporter (40) or space the folding part supporter (40) apart from the folding part (30) to serve as selfie sticks with the folding part (30) and the folding part supporter (40).

Further, an engaging protruding part (11) may be formed on the outer circumferential surface of the attachable disk (10) to prevent separation of the attachable disk coupling part (21) in a thickness direction of the attachable disk (10) in a state in which the attachable disk coupling part (21) is coupled, the attachable disk coupling part (21) may be formed in a C shape of which an opening (21a) is formed in one side thereof so that the attachable disk (10) may be inserted and coupled thereto, and the extending part (22) may be provided with a plurality of cut parts (22a) at a portion adjacent to the attachable disk coupling part (21) so that the opening (21a) of the attachable disk coupling part (21) may be open when the attachable disk (10) and the attachable disk coupling part (21) are coupled.

In addition, the combination of a holder and a selfie stick may further include a back supporter (60) for a folding part supporter provided to be accommodated in a center portion of the folding part supporter (40), hinge-coupled to an upper portion of the folding part supporter (40) adjacent to the folding part (30) to be folded so as to be accommodated in the folding part supporter (40) or rotatable toward a back of the folding part supporter (40), configured to rotate toward the back of the folding part supporter (40) to form a Λ shape with the folding part supporter (40), support the back of the folding part supporter (40), and support the case main body supporter (20) with the folding part supporter (40) to support the smart phone (1) accommodated in the case main body (2) attached to the attachable disk (10) coupled to the attachable disk coupling part (21) of the case main body supporter (20) when the folding part supporter (40) rotates to be inclined from the folding part (30) in a frontward direction, and configured to serve as a holder and a handle with the folding part supporter (40) in a folded state.

In addition, the back supporter (60) for a folding part supporter may be formed of an upper back supporter (61) having an upper portion hinge-coupled to an upper portion of the folding part supporter (40) and provided with insertion parts (61a) in a lower portion thereof, and a lower back supporter (62) provided under the upper back supporter (61) and provided with a pair of insertion part coupling guides (62a), to which the insertion parts (61a) of the upper back supporter (61) are insertion-coupled and the insertion part (61a) are inserted and withdrawn, at both sides thereof.

In addition, a plurality of engaging grooves (62b) may be formed in the lower back supporter (62) to be spaced apart from each other in an insertion and withdrawal direction of the insertion parts (61a) in the pair of insertion part coupling guides (62a), and the insertion parts (61a) of the upper back supporter (61) may be provided with the engaging protrusion (61b) inserted into the engaging groove (62b) to fix the lower back supporter (62) to the upper back supporter (61) at lower portions thereof, and an elastic piece (61c) formed to be cut in a U shape to include the engaging protrusion (61b) and configured to space the engaging protrusion (61b) apart from the engaging groove (62b) due to pressing in a direction perpendicular to the insertion and withdrawal direction of the insertion parts (61a) to allow the insertion parts (61a) to be inserted and withdrawn.

In addition, the combination of a holder and a selfie stick may further include a lower back supporter auxiliary supporter (63) formed in a U shape and of which an inner side is hinge-coupled to an outer side of a lower end portion of the lower back supporter (62) and rotates to come into contact with a floor and assist in supporting the lower back supporter (62).

In addition, the folding part supporter (40) may be equipped with an auxiliary battery (70) configured to charge the smart phone.

Advantageous Effects

A combination of a holder and a selfie stick of the present invention according to the above is used by being coupled to a smart phone case when used as a holder and a selfie stick, and is conveniently separated from the smart phone case so that only the smart phone case is carried when not used as the holder and the selfie stick, and thus usage is very convenient.

Further, since a process of holding the smart phone is simple, usage is very convenient.

In addition, since the smart phone is separated from the smart phone case so as to absorb a shock when the smart phone is dropped, damage of the smart phone due to a drop can be minimized.

MODES OF THE INVENTION

Hereinafter, a combination of a holder and a selfie stick of the present invention will be described in detail with reference to the drawings.

Figure 1:
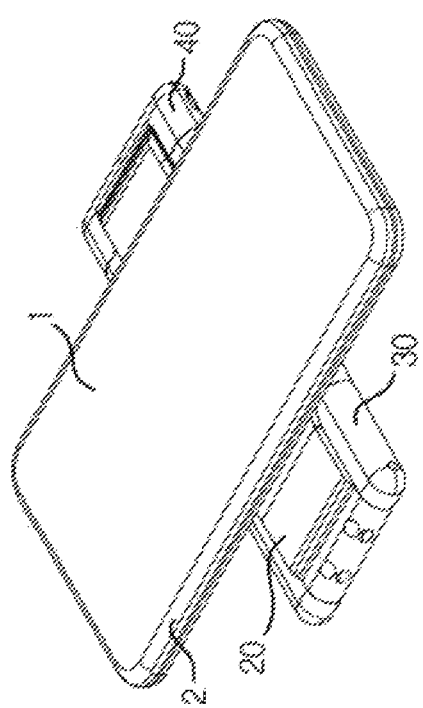
FIGS. 1 to 3 are views illustrating operation states of a combination of a holder and a selfie stick of the present invention.
Figure 2:
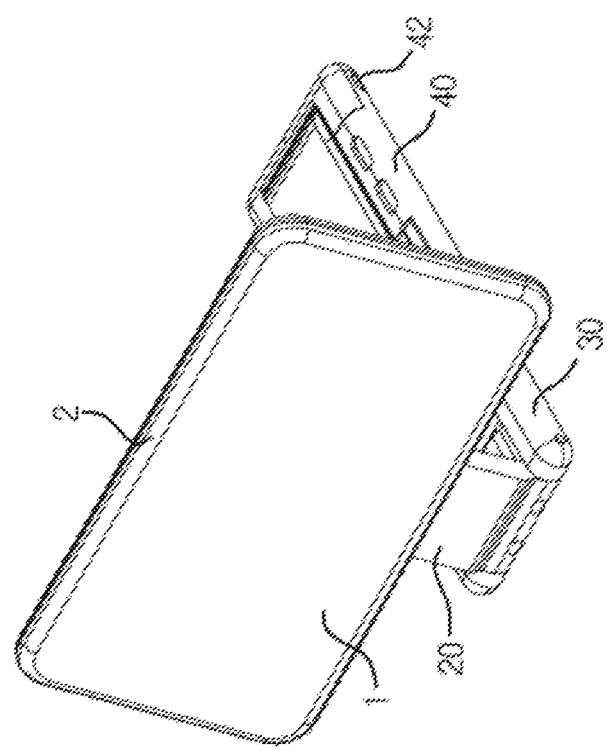
Figure 3:
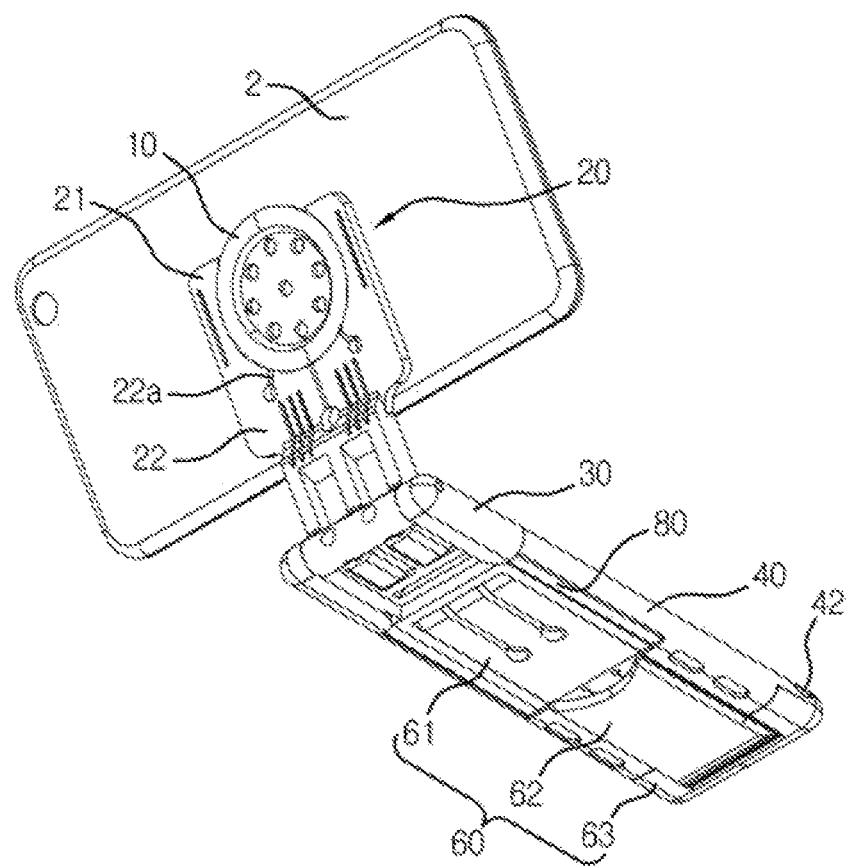
Figure 4:
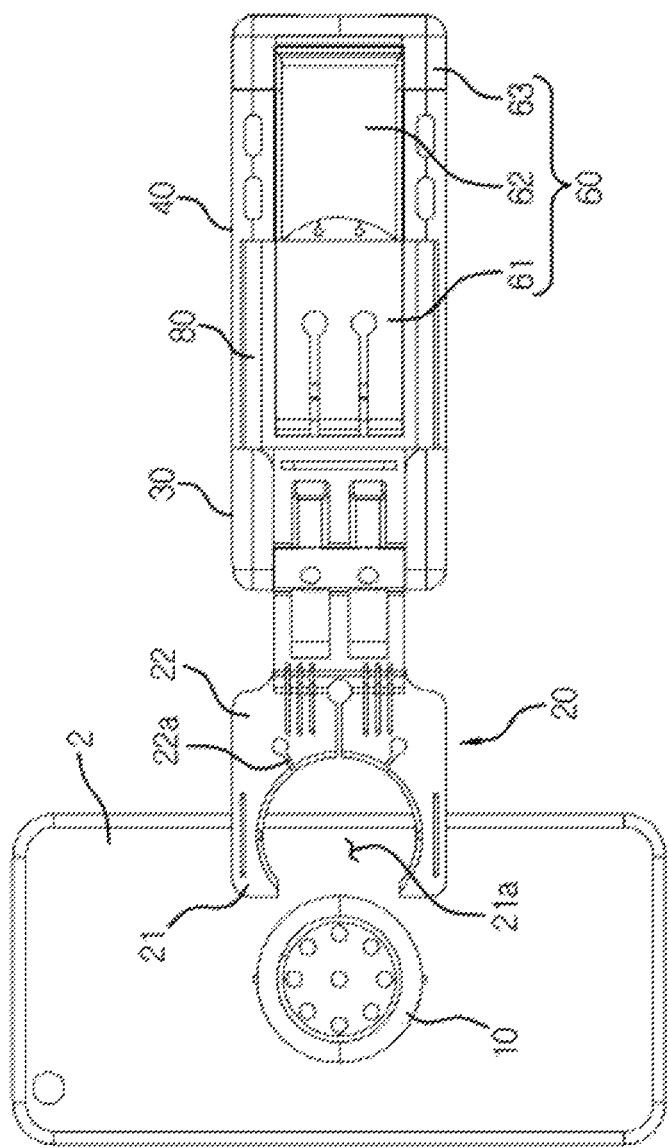
FIG. 4 is a view illustrating a state in which a case main body supporter is separated from an attachable disk.
Figure 5:
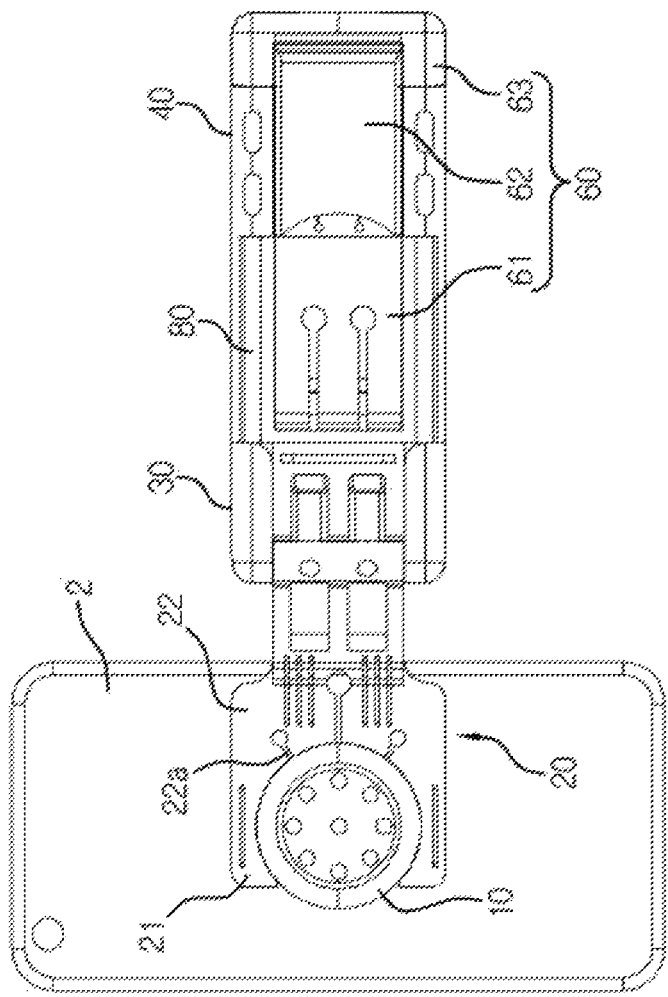
FIG. 5 is a view illustrating a state in which the case main body supporter is coupled to the attachable disk.
Figure 6:
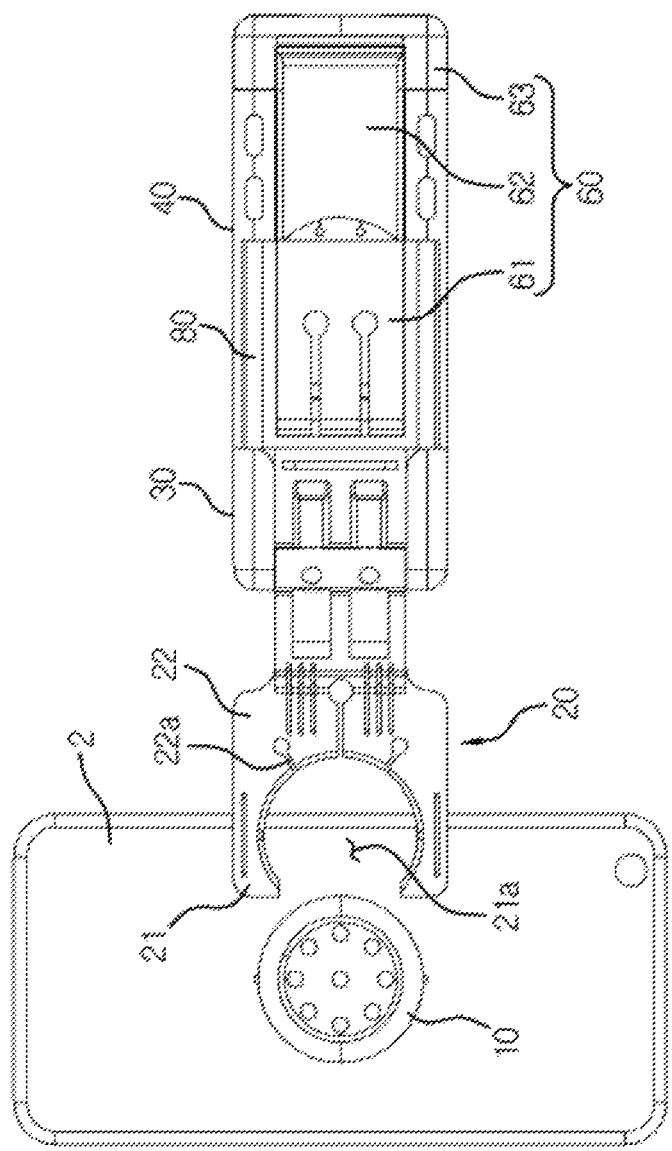
FIG. 6 is a view illustrating a state in which the case main body supporter is separated from the attachable disk.
Figure 9:
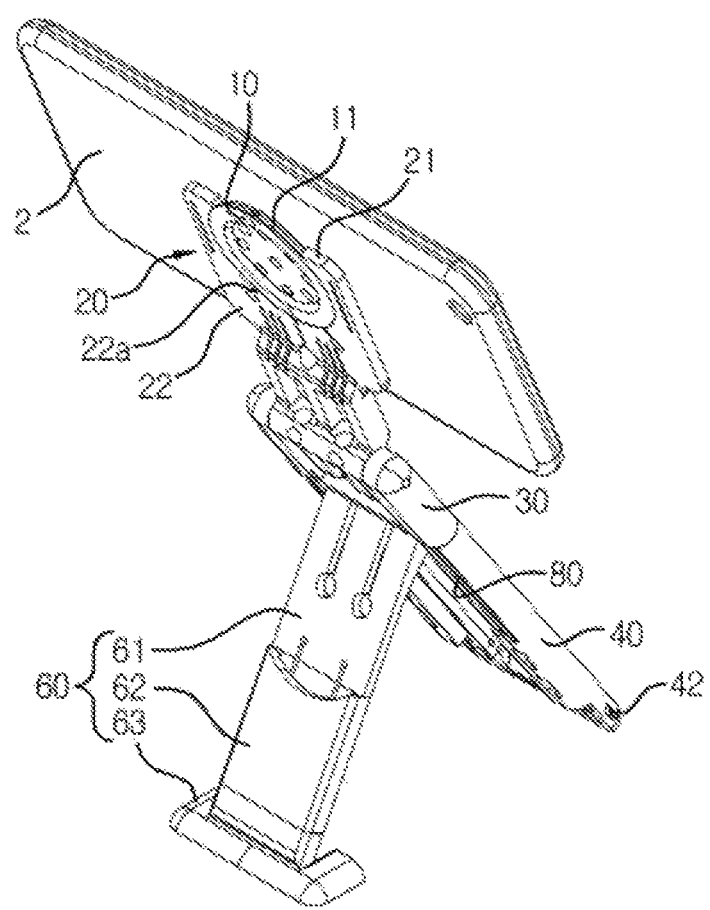
Figure 10:
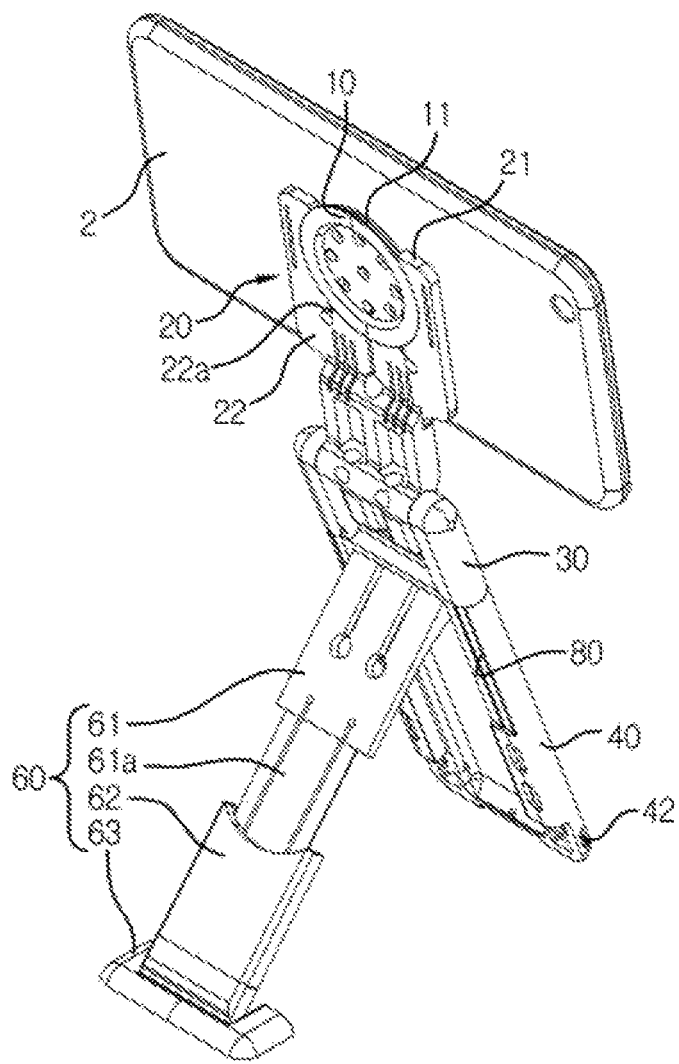
Figure 11:
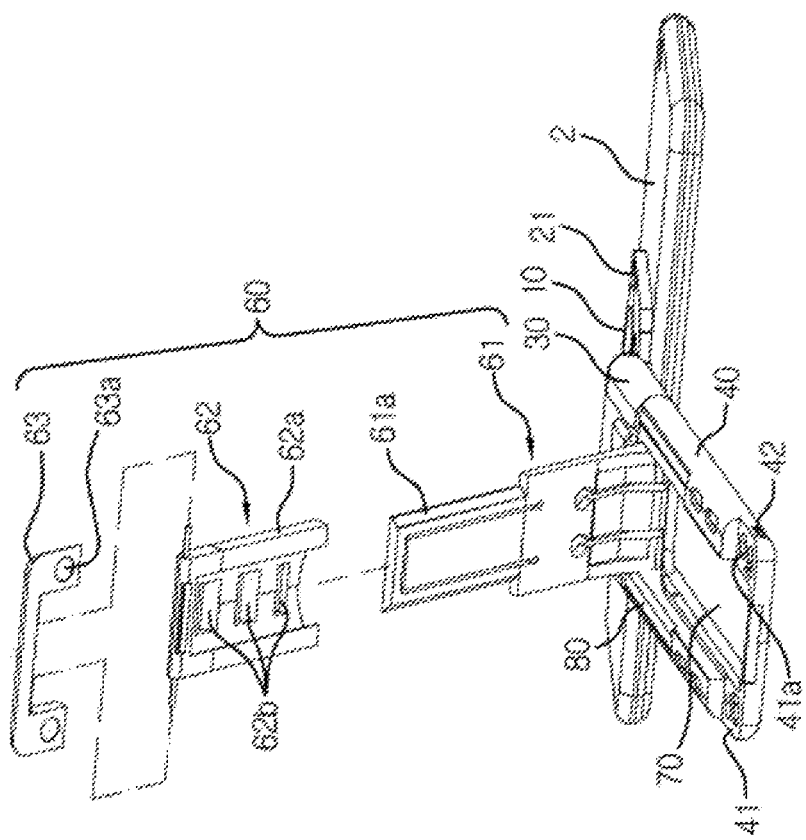
FIGS. 11 and 12 are exploded perspective views illustrating a coupling structure between a lower back supporter and an upper back supporter.
Figure 12:
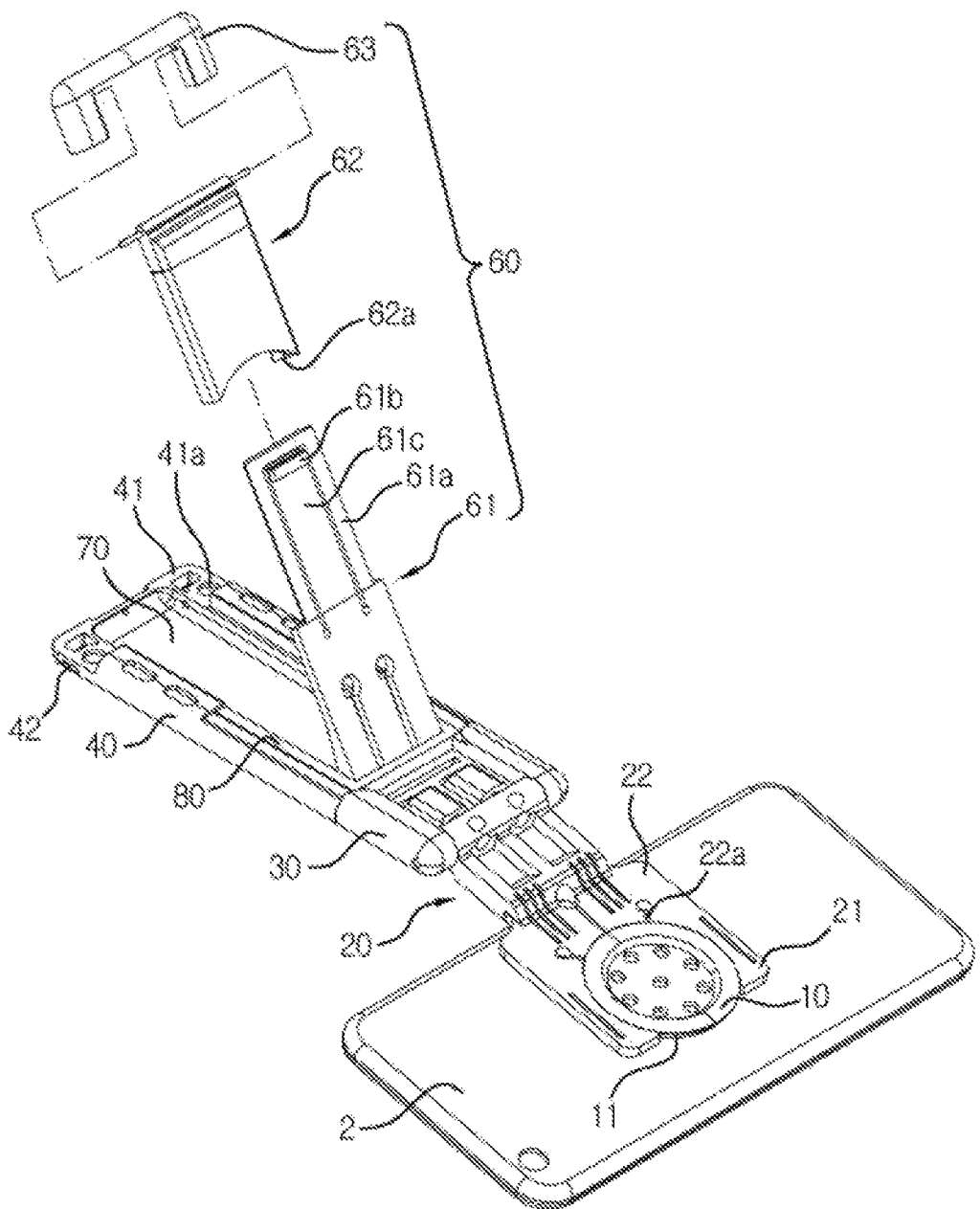
Figure 13:
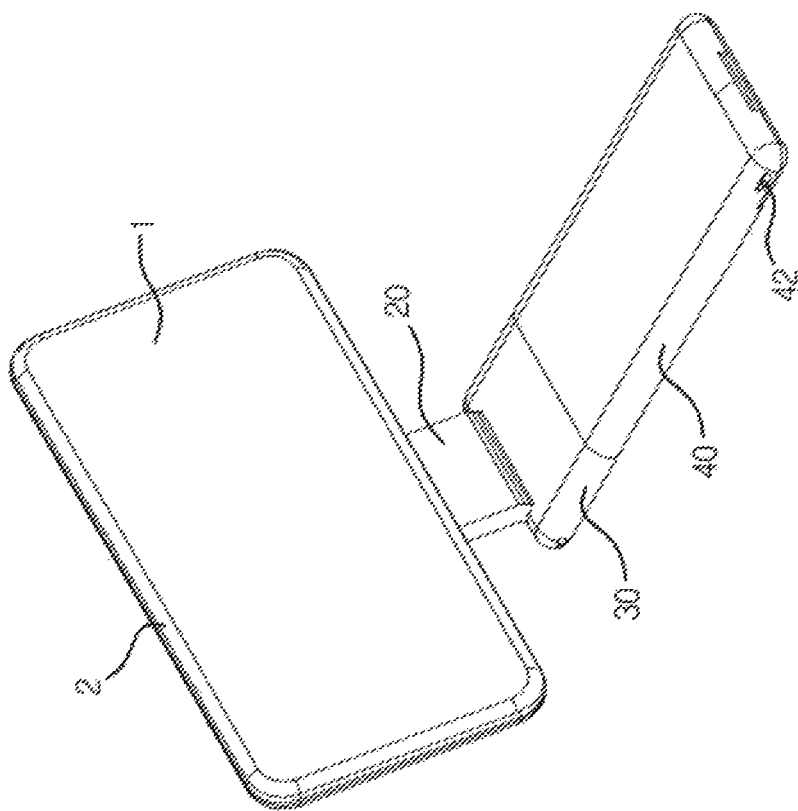
FIGS. 13 and 14 are views illustrating an operation state in which the combination of a holder and a selfie stick of the present invention is used for taking a selfie.
Figure 14:
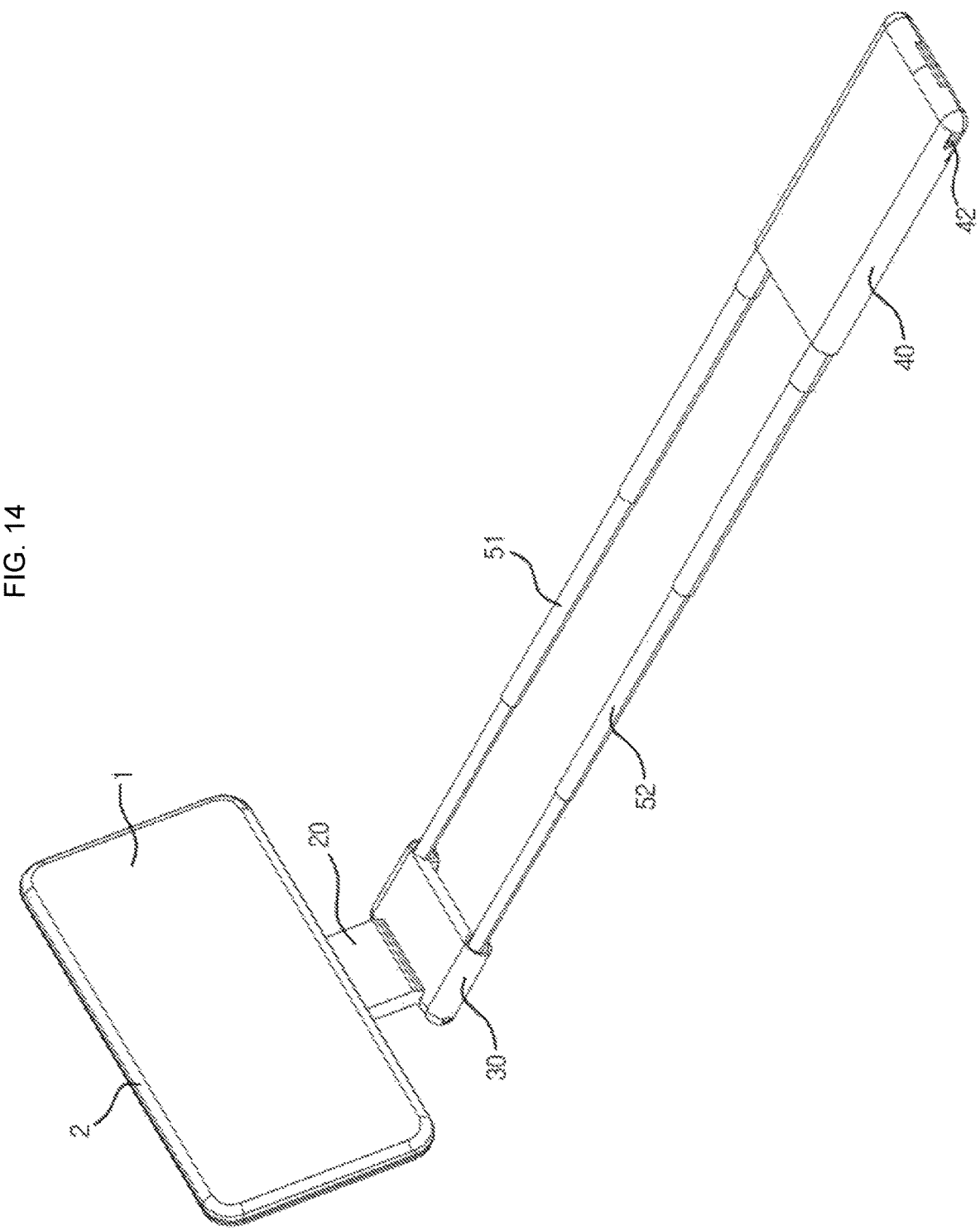
Figure 15:
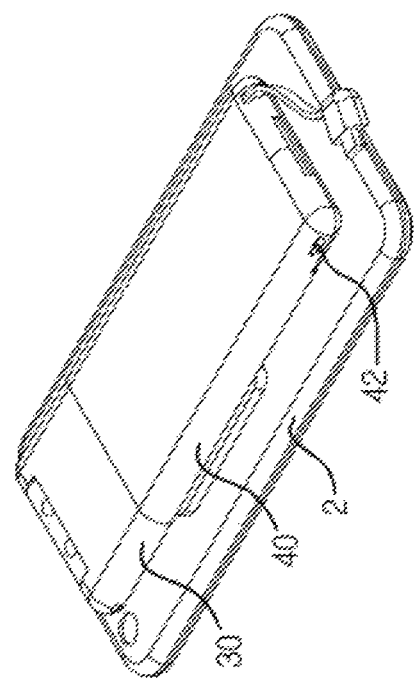
FIGS. 15 and 16 are views illustrating a state in which the combination of a holder and a selfie stick is used for charging.
Figure 16:
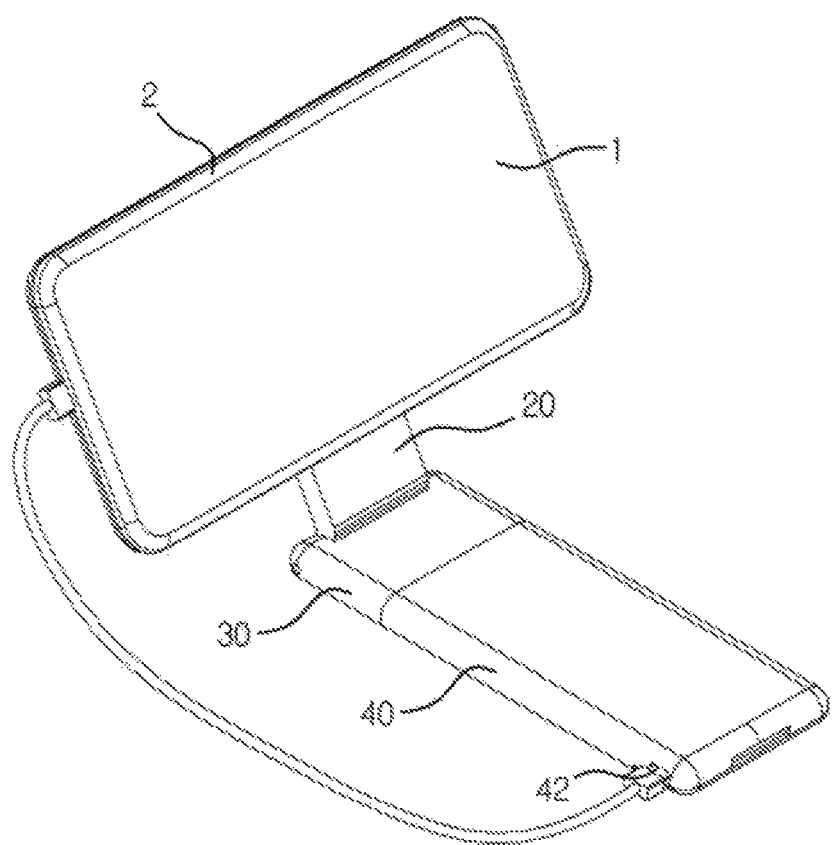
Figure 17:
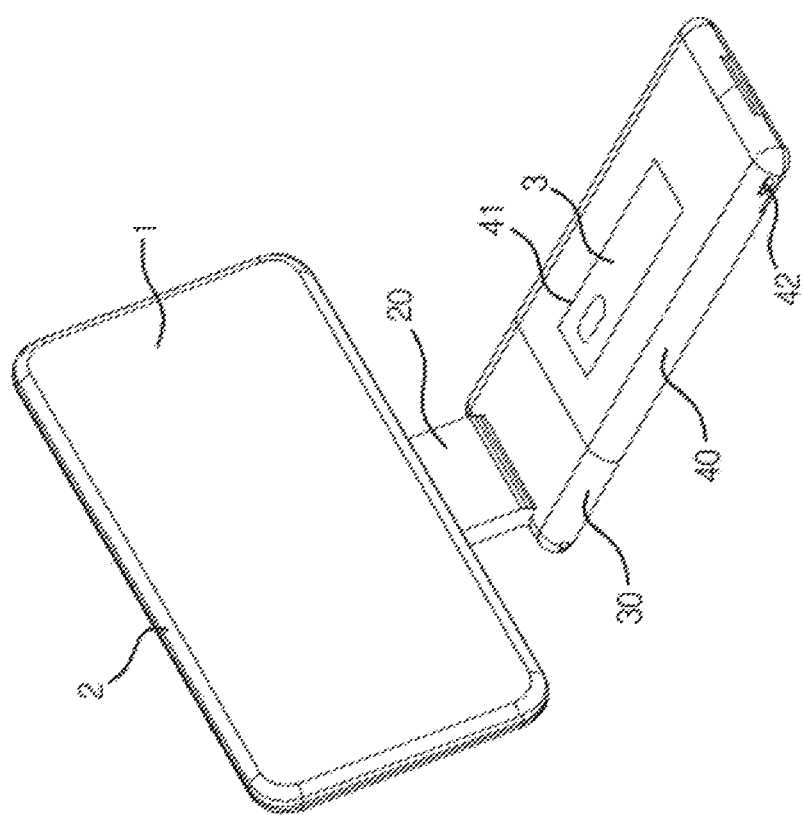
FIG. 17 is a view illustrating a state of another combination of a holder and a selfie stick of the present invention.

FIGS. 1 to 3 are views illustrating operation states of a combination of a holder and a selfie stick of the present invention, FIG. 4 is a view illustrating a state in which a case main body supporter is separated from an attachable disk, FIG. 5 is a view illustrating a state in which the case main body supporter is coupled to the attachable disk, FIG. 6 is a view illustrating a state in which the case main body supporter is separated from the attachable disk, FIGS. 7 to 10 are views illustrating a state in which a function as a holder is performed that allows the smart phone to be held in a laterally standing state, FIGS. 11 and 12 are exploded perspective views illustrating a coupling structure between a lower back supporter and an upper back supporter, FIGS. 13 and 14 are views illustrating an operation state in which the combination of a holder and a selfie stick of the present invention is used for taking a selfie, FIGS. 15 and 16 are views illustrating a state in which the combination of a holder and a selfie stick is used for charging, and FIG. 17 is a view illustrating another combination of a holder and a selfie stick of the present invention.

The combination of a holder and a selfie stick according to the present invention includes an attachable disk 10, a case main body supporter 20, a folding part 30, a folding part supporter 40, and a first extendable stick 51 and a second extendable stick 52.

The case main body 2 is provided with a space in which a smart phone 1 is accommodated to be laid therein. The case main body 2 is a general case which fixes an edge of the smart phone and covers a back surface of the smart phone 1 by inserting the smart phone 1 through a front surface.

The attachable disk 10 is attached to a back surface of the case main body 2 and formed as a disk. The attachable disk 10 and the case main body 2 may be attached to each other in a rivet shape but may be attached through double-sided tape.

The case main body supporter 20 is formed of an attachable disk coupling part 21 and an extending part 22.

The attachable disk coupling part 21 is detachably coupled to an outer circumferential surface of the attachable disk 10 to be rotatable from the attachable disk 10.

The extending part 22 extends from the attachable disk coupling part 21 in an outward direction of the case main body 2. The folding part 30 is hinge-coupled to an end portion of the extending part 22.

The folding part 30 has one side end portion hinge-coupled to an end portion of the extending part 22 of the case main body supporter 20 to be folded so as to be in contact with the case main body supporter 20 or spaced apart from the case main body supporter 20 and is formed in a plate shape which supports the case main body supporter 20.

The folding part supporter 40 is located at the other side end portion of the folding part 30 and has a plate shape elongated in a longitudinal direction of the folding part 30 to support the folding part 30. The folding part supporter 40 serves as a holder when a back surface thereof is supported on a floor and serves as a handle when taking a selfie using the smart phone 1.

The first extendable stick 51 and the second extendable stick 52 connect both sides of the other side end portion of the folding part 30 and one end side portion of the folding part supporter 40 to bring the other side end portion of the folding part 30 into contact with the one side end portion of the folding part supporter 40 to assist the support of the folding part supporter 40 or space the folding part supporter 40 apart from the folding part 30, thereby serving as selfie sticks with the folding part 30 and the folding part supporter 40.

The above-described combination of a holder and a selfie stick of the present invention is used as described below.

The combination of a holder and a selfie stick becomes the state in FIG. 1 when the case main body 2 provided with the space in which the smart phone 1 is accommodated to be laid is rotated. When the case main body 2 is rotated at an acute angle in the state in FIG. 1, since the attachable disk coupling part 21 of the case main body supporter 20 is coupled to the attachable disk 10 and the extending part 22 of the case main body supporter 20 is hinge-coupled to the folding part 30, the case main body supporter 20 is rotated from the folding part 30, and thus the combination of a holder and a selfie stick becomes the state in FIG. 2. When the case main body 2 is rotated further in the state in FIG. 2 and thus forms an obtuse angle with the folding part 30, the combination of a holder and a selfie stick becomes the state in FIG. 3. The state in FIG. 3 is a state which is the same as that in FIG. 13 which will be described later. As will be described later, in the state in FIG. 13, the combination of a holder and a selfie stick may serve as a smart phone holder which supports the smart phone in a laterally standing state.

FIG. 4 is a view illustrating a state in which the attachable disk coupling part 21 of the case main body supporter 20 is separated from the attachable disk 10, and FIG. 5 is a view illustrating a state in which the attachable disk coupling part 21 of the case main body supporter 20 is coupled to the attachable disk 10.

As shown in the drawings, as shown in FIG. 6, when the attachable disk coupling part 21 of the case main body supporter 20 is separated from the attachable disk 10, the case main body 2 may be carried with the attachable disk 10 attached thereto, and the case main body 2 may perform a role of a case that accommodates and protects the smart phone.

The separated device is carried separately from the case main body 2, and when a smart phone holder and a selfie stick are necessary, the attachable disk coupling part 21 of the case main body supporter 20 may be coupled to the attachable disk 10 to be used.

In order to easily couple the attachable disk coupling part 21 to the attachable disk 10, the attachable disk coupling part 21 is formed in a C shape of which an opening 21a is formed therein, and the extending part 22 is provided with cut parts 22a (see FIG. 4).

The attachable disk coupling part 21 is formed in the C shape of which the opening 21a is formed in one side thereof so that the attachable disk 10 may be inserted and coupled thereto.

The extending part 22 is provided with a plurality of cut parts 22a at a portion adjacent to the attachable disk coupling part 21 so that the opening 21a of the attachable disk coupling part 21 may be open when the attachable disk 10 and the attachable disk coupling part 21 are coupled.

The extending part 22 may be formed of an elastic material so that the attachable disk coupling part 21 is separated from the attachable disk 10 in a state of being coupled to the attachable disk 10 and then the opening 21a of the attachable disk coupling part 21 opened by the cut parts 22a may be restored to a state before coupling.

Figure 7:
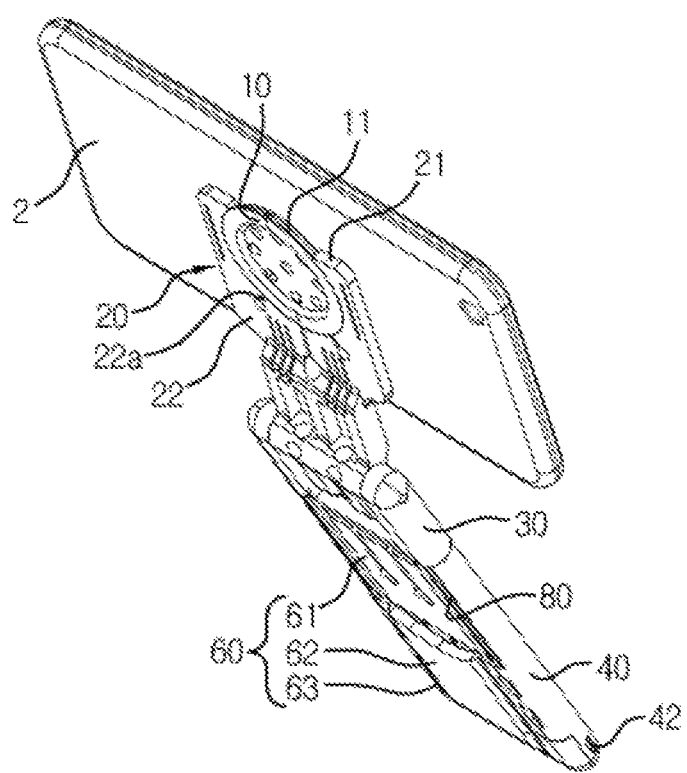
FIGS. 7 to 10 are views illustrating a state in which a function as a holder is performed that allows the smart phone to be held in a laterally standing state.

Further, an engaging protruding part 11 is formed on the outer circumferential surface of the attachable disk 10 to prevent separation of the attachable disk coupling part 21 in a thickness direction of the attachable disk 10 in a state in which the attachable disk coupling part 21 is coupled to the attachable disk 10 (see FIG. 7).

In addition, a bearing may be provided in the outer circumferential surface of the attachable disk 10 so that the attachable disk coupling part 21 coupled to the attachable disk 10 easily rotates.

In addition, the outer circumferential surface of the attachable disk 10 may be provided with an engaging protrusion so that the attachable disk coupling part 21 is engaged with a click at a position in which an angle formed by an extending direction of the extending part 22 and a lateral direction of the case main body 10 is a right angle, and the attachable disk coupling part 21 may be provided with an engaging groove at a position corresponding to the engaging protrusion. Due to the engaging protrusion and the engaging groove, holding the smart phone in the laterally standing state or adjusting an angle of the smart phone for taking a selfie become easy.

In the state in FIG. 3 in which the case main body 2 is rotated and thus forms the obtuse angle with the folding part 30 (a state which is the same as the state in FIG. 13), when the folding part 30 and the folding part supporter 40 come into contact with the floor, the smart phone 1 is held in the laterally standing state.

The state in each of FIGS. 3 and 13 is a state in which a position of the state where the smart phone 1 is held low.

In order to raise the position of the smart phone 1 in the held state greater than that in the state in each of FIGS. 3 and 13, the present invention is provided with a back supporter 60 for a folding part supporter in the folding part supporter 40.

The back supporter 60 for a folding part supporter is provided to be accommodated in a center portion of the folding part supporter 40 and hinge-coupled to an upper portion of the folding part supporter 40 adjacent to the folding part 30 to be folded so as to be accommodated in the folding part supporter 40 or rotatable toward a back of the folding part supporter 40. Further, the back supporter 60 for a folding part supporter rotates toward the back of the folding part supporter 40 to form a Λ shape with the folding part supporter 40, supports the back of the folding part supporter 40, and supports the case main body supporter 20 with the folding part supporter 40 to support the smart phone 1 accommodated in the case main body 2 attached to the attachable disk 10 coupled to the attachable disk coupling part 21 of the case main body supporter 20 when the folding part supporter 40 rotates to be inclined from the folding part 30 in a frontward direction, and serves as a holder and a handle with the folding part supporter 40 in a folded state.

Further, the back supporter 60 for a folding part supporter may be formed of an upper back supporter 61 and a lower back supporter 62.

In the upper back supporter 61, an upper portion is hinge-coupled to an upper portion of the folding part supporter 40, and insertion parts 61a are provided in a lower portion thereof.

The lower back supporter 62 is provided under the upper back supporter 61 and is provided with a pair of insertion part coupling guides 62a, to which the insertion parts 61a of the upper back supporter 61 are insertion-coupled and the insertion part 61a is inserted and withdrawn, at both sides thereof.

Further, a plurality of engaging grooves 62b may be formed in the lower back supporter 62 to be spaced apart from each other in an insertion and withdrawal direction of the insertion parts 61a in the pair of insertion part coupling guides 62a. In addition, the insertion parts 61a of the upper back supporter 61 are provided with the engaging protrusion 61b inserted into the engaging groove 62b to fix the lower back supporter 62 to the upper back supporter 61 at lower portions thereof. In addition, the insertion parts 61a of the upper back supporter 61 may be provided with an elastic piece 61c which is formed to be cut in a U shape to include the engaging protrusion 61b and spaces the engaging protrusion 61b apart from the engaging groove 62b due to pressing in a direction perpendicular to the insertion and withdrawal direction of the insertion parts 61a to allow the insertion parts 61a to be inserted and withdrawn. As described above, when the back supporter 60 for a folding part supporter is formed of the upper back supporter 61 and the lower back supporter 62 so as to allow the insertion parts 61a of the lower back supporter 62 to be inserted and withdrawn, a holding height and a standing angle of the smart phone may be adjusted.

Further, in order to increase a supporting area of the lower back supporter 62 to stably support, a lower back supporter auxiliary supporter 63 may be provided on a lower end portion of the lower back supporter 62.

The lower back supporter auxiliary supporter 63 is formed in a U shape, and an inner side of the lower back supporter auxiliary supporter 63 is hinge-coupled to an outer side of a lower end portion of the lower back supporter 62 and rotates to come into contact with a floor and assist in supporting the lower back supporter 62.

Since a lower end of the lower back supporter auxiliary supporter 63 is coupled to the lower back supporter 62 at a lower level than the lower back supporter 62, when the lower back supporter 62 comes into contact with the floor, the lower back supporter auxiliary supporter 63 naturally rotates on the basis of a hinge-coupling portion and comes into contact with the floor to increase the supporting area of the lower back supporter 62, and thus stable support is achieved.

The folding part supporter 40 is provided with a seating part 41 on which the lower back supporter auxiliary supporter 63 is seated before the lower back supporter 62 rotates in a backward direction, the seating part 41 is provided with a magnet 41a (see FIGS. 11 and 12), and the lower back supporter auxiliary supporter 63 is provided with a magnetic material 63a attachable to the magnet 41a. As described above, since the magnet 41a and the magnetic material 63a are provided, when the function as the holder is not used, rotation of the lower back supporter 62 in the backward direction may be restricted.

FIGS. 7 to 10 are views illustrating a state in which the function as the holder is performed that allows the smart phone to be held in a laterally standing state and show an operation state in which the smart phone 1 is held at a higher level than the smart phone 1 in the state in each of FIGS. 3 and 13.

Figure 8:
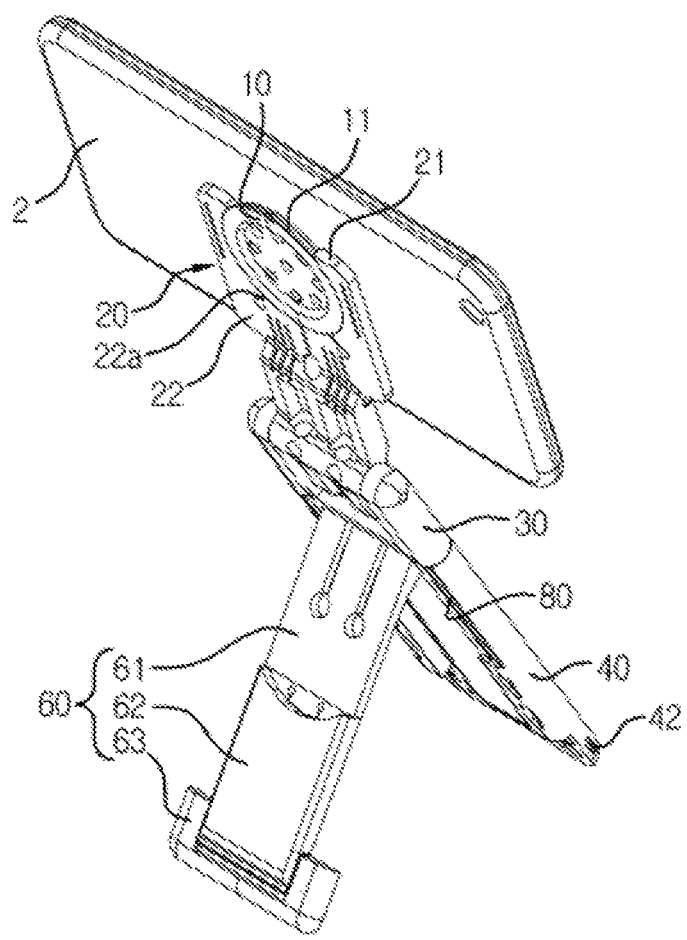

In the state in FIG. 7 which is the same as the state in FIG. 3 in which the case main body 2 rotates from the state in FIG. 1 to form the obtuse angle with the folding part 30, when the back supporter 60 for a folding part supporter provided to be accommodated in the center portion of the folding part supporter 40 rotates to the back of the folding part supporter 40 to form the Λ shape with the folding part supporter 40 to support the back of the folding part supporter 40, the combination of a holder and a selfie stick becomes the state in FIG. 8. In the state in FIG. 8, when the lower back supporter auxiliary supporter 63 hinge-coupled to an outer side of the lower end portion of the lower back supporter 62 rotates to come into contact with the floor, the combination of a holder and a selfie stick becomes the state in FIG. 9. When withdrawal lengths of the insertion parts 61a are adjusted to adjust the holding height and the standing angle of the smart phone, the combination of a holder and a selfie stick becomes the state in FIG. 10.

FIGS. 11 and 12 are exploded perspective views illustrating a coupling structure between the lower back supporter 62 and the upper back supporter 61.

FIG. 11 illustrates that the lower back supporter 62 is provided with the engaging grooves 62b, and the insertion parts 61a are insertion-coupled to the insertion part coupling guides 62a.

As shown in FIG. 12, the upper back supporter 61 is provided with the elastic piece 61c which is formed to be cut in the U shape, and the elastic piece 61c is provided with the engaging protrusion 61b inserted into and engaged with the engaging grooves 62b shown in FIG. 11.

When the engaging protrusion 61b is spaced apart from the engaging grooves 62b, the insertion parts 61a may be inserted and withdrawn. In order to space the engaging protrusion 61b apart from the engaging grooves 62b, the elastic piece 61c is pressed to be spaced apart therefrom.

Further, the folding part 30 and the folding part supporter 40 of the present invention may be provided with a case main body supporter accommodation groove 80 to accommodate the case main body supporter 20 in a state of coming into contact with the case main body supporter 20. When the case main body supporter 20 is accommodated in the case main body supporter accommodation groove 80, since the folding part 30 and the folding part supporter 40 may come into contact with the back surface of the case main body 2 in the folded state to minimize exposure of the case main body supporter 20, aesthetics are not spoiled.

Further, the folding part 30 and the folding part supporter 40 may have the thickness and may be located on the same plane.

FIG. 13 illustrates a state when the smart phone 1 is held in the laterally standing state, but before being used as a selfie stick. In the state in FIG. 13, when the folding part supporter 40 is pulled out to be spaced apart from the folding part 30, the first extendable stick 51 and the second extendable stick 52 are simultaneously elongated, and the folding part supporter 40 serves as a handle of the selfie stick (see FIG. 14). The selfie may be taken in the state in FIG. 14.

In the present invention, the folding part supporter 40 may be equipped with an auxiliary battery 70 which charges the smart phone (see FIGS. 11 and 12).

FIG. 15 illustrates that a charging port which charges the auxiliary battery 70 equipped in the folding part supporter 40 is provided, and the folding part supporter 40 is provided with a port for charging that may charge the smart phone from the auxiliary battery 70. In this case, a smart phone of a user or a smart phone of another person may be charged in a state in which the attachable disk coupling part 21 of the case main body supporter 20 is separated from the attachable disk 10.

FIG. 16 illustrates that the smart phone which is held is charged from the auxiliary battery 70 equipped in the folding part supporter 40. In this case, an operation of the smart phone may be performed while the smart phone is charged in a held state.

Further, the folding part supporter 40 may be provided with a remote controller detaching groove 41 from which a remote controller 3 for remote control of smart phone imaging is detachable.

FIG. 17 is the view illustrating the state of another combination of a holder and a selfie stick of the present invention, and the folding part supporter 40 is provided with a remote controller detaching groove 41, and a remote controller 3 for remote control of smart phone imaging is inserted into and equipped in the remote controller detaching groove 41.

The remote controller 3 inserted into the remote controller detaching groove 41 is provided for remote control of the smart phone imaging, and it is known that a Bluetooth function is provided to operate in conjunction with a smart phone of a user.

When the folding part supporter 40 is pulled out to be spaced apart from the folding part 30, the first extendable stick 51 and the second extendable stick 52 are simultaneously elongated, and in the state in FIG. 14 in which the folding part supporter 40 serves as the handle of the selfie stick, the selfie may be taken by operating the remote controller 3 equipped in the remote controller detaching groove 41 provided in the folding part supporter 40.

Further, in the state in FIG. 9 or 10 in which the smart phone is held, when the remote controller 3 provided in the folding part supporter 40 is separated from the remote controller detaching groove 41, remote imaging may be performed at long range using the remote controller 3.

The technical spirit should not be understood within the above-described embodiments of the present invention. A technical scope is varied, and various modifications may be performed within the principle of the present invention in the claims by those skilled in the art. Accordingly, the improvement and changes apparent to those skilled in the art are within the scope of the present invention.

The invention claimed is:

1. A combination of a holder and a selfie stick comprising:
   an attachable disk (10) attached to a back surface of a case main body (2) provided with a space in which a smart phone (1) is accommodated to be laid, and formed as a disk;
   a case main body supporter (20) formed of an attachable disk coupling part (21) detachably coupled to an outer circumferential surface of the attachable disk (10) to be rotatable, and an extending part (22) configured to extend from the attachable disk coupling part (21) in an outward direction of the case main body (2);
   a folding part (30) formed in a plate shape which supports the case main body supporter (20) and having one side end portion hinge-coupled to an end portion of the extending part (22) of the case main body supporter (20) to be folded to be in contact with the case main body supporter (20) or spaced apart from the case main body supporter (20);
   a folding part supporter (40) located at the other side end portion of the folding part (30), having a plate shape elongated in a longitudinal direction of the folding part (30) to support the folding part (30), configured to serve as a holder when a back surface thereof is supported on a floor, and configured to serve as a handle when selfie is taken by a smart phone (1); and
   a first extendable stick (51) and a second extendable stick (52) configured to connect both sides of the other side end portion of the folding part (30) and one end side portion of the folding part supporter (40) and configured to bring the other side end portion of the folding part (30) into contact with the one side end portion of the folding part supporter (40) to assist in supporting the folding part supporter (40) or space the folding part supporter (40) apart from the folding part (30) to serve as selfie sticks with the folding part (30) and the folding part supporter (40).

2. The combination of a holder and a selfie stick of claim 1, wherein:
   an engaging protruding part (11) is formed on the outer circumferential surface of the attachable disk (10) to prevent separation of the attachable disk coupling part (21) in a thickness direction of the attachable disk (10) in a state in which the attachable disk coupling part (21) is coupled;
   the attachable disk coupling part (21) is formed in a C shape of which an opening (21*a*) is formed in one side thereof so that the attachable disk (10) is inserted and coupled thereto; and
   the extending part (22) is provided with a plurality of cut parts (22*a*) at a portion adjacent to the attachable disk coupling part (21) so that the opening (21*a*) of the attachable disk coupling part (21) is open when the attachable disk (10) and the attachable disk coupling part (21) are coupled.

3. The combination of a holder and a selfie stick of claim 1, further comprising a back supporter (60) for a folding part supporter provided to be accommodated in a center portion of the folding part supporter (40), hinge-coupled to an upper portion of the folding part supporter (40) adjacent to the folding part (30) to be folded so as to be accommodated in the folding part supporter (40) or rotatable toward a back of the folding part supporter (40), configured to rotate toward the back of the folding part supporter (40) to form a Λ shape with the folding part supporter (40), support the back of the folding part supporter (40), and support the case main body supporter (20) with the folding part supporter (40) to support the smart phone (1) accommodated in the case main body (2) attached to the attachable disk (10) coupled to the attachable disk coupling part (21) of the case main body supporter (20) when the folding part supporter (40) rotates to be inclined from the folding part (30) in a frontward direction, and configured to serve as a holder and a handle with the folding part supporter (40) in a folded state.

4. The combination of a holder and a selfie stick of claim 3, wherein the back supporter (60) for a folding part supporter is formed of an upper back supporter (61) having an upper portion hinge-coupled to an upper portion of the folding part supporter (40) and provided with insertion parts (61*a*) in a lower portion thereof, and a lower back supporter (62) provided under the upper back supporter (61) and provided with a pair of insertion part coupling guides (62*a*), to which the insertion parts (61*a*) of the upper back supporter (61) are insertion-coupled and the insertion parts (61*a*) are inserted and withdrawn, at both sides thereof.

5. The combination of a holder and a selfie stick of claim 4, wherein:
 a plurality of engaging grooves (62*b*) are formed in the lower back supporter (62) to be spaced apart from each other in an insertion and withdrawal direction of the insertion parts (61*a*) in the pair of insertion part coupling guides (62*a*); and
 the insertion parts (61*a*) of the upper back supporter (61) are provided with the engaging protrusion (61*b*) inserted into the engaging groove (62*b*) to fix the lower back supporter (62) to the upper back supporter (61) at lower portions thereof, and an elastic piece (61*c*) formed to be cut in a U shape to include the engaging protrusion (61*b*) and configured to space the engaging protrusion (61*b*) apart from the engaging groove (62*b*) due to pressing in a direction perpendicular to the insertion and withdrawal direction of the insertion parts (61*a*) to allow the insertion parts (61*a*) to be inserted and withdrawn.

6. The combination of a holder and a selfie stick of claim 5, further comprising a lower back supporter auxiliary supporter (63) formed in a U shape and of which an inner side is hinge-coupled to an outer side of a lower end portion of the lower back supporter (62) and rotates to come into contact with a floor and assist in supporting the lower back supporter (62).

7. The combination of a holder and a selfie stick of claim 1, wherein the folding part supporter (40) is equipped with an auxiliary battery (70) configured to charge the smart phone.

8. The combination of a holder and a selfie stick of claim 1, wherein the folding part supporter (40) is provided with a remote controller detaching groove (64) from which a remote controller (2) for remote control of smart phone imaging is detachable.

\* \* \* \* \*